United States Patent [19]

Lagodmos

[11] Patent Number: 4,770,004
[45] Date of Patent: Sep. 13, 1988

[54] CRYOGENIC THERMAL SWITCH

[75] Inventor: George P. Lagodmos, Palos Verdes, Calif.

[73] Assignee: Hughes Aircraft Company, Los Angeles, Calif.

[21] Appl. No.: 873,898

[22] Filed: Jun. 13, 1986

[51] Int. Cl.[4] ............................................. F28F 27/00
[52] U.S. Cl. ..................................... 62/383; 165/32; 165/185
[58] Field of Search ............ 62/383, 514; 165/32 HV, 165/96 HV, 185; 236/102; 337/139, 307

[56] References Cited

U.S. PATENT DOCUMENTS

| | | | |
|---|---|---|---|
| 564,979 | 8/1896 | Dixon et al. | 236/102 X |
| 3,112,878 | 12/1963 | Snelling | 236/1 |
| 3,260,055 | 7/1966 | Webb | 62/6 |
| 3,430,455 | 3/1969 | Stuart et al. | 165/32 HV |
| 3,531,752 | 9/1970 | Gourley | 337/139 |
| 3,609,992 | 10/1971 | Cacheux | 62/514 |
| 3,807,188 | 4/1974 | Lagodmos | 165/96 HV |
| 4,261,174 | 4/1981 | Wagstaffe | 236/102 X |
| 4,281,708 | 8/1981 | Wing et al. | 165/32 HV |
| 4,388,965 | 6/1983 | Cunningham et al. | 165/32 HV |
| 4,399,661 | 8/1983 | Durenec et al. | 62/65 |
| 4,575,629 | 3/1986 | Schnell et al. | 250/238 |

FOREIGN PATENT DOCUMENTS

| | | |
|---|---|---|
| 1202711 | 1/1960 | France . |
| 1518726 | 3/1968 | France . |
| 1569828 | 6/1969 | France . |
| 2139624 | 1/1973 | France . |

Primary Examiner—Harry B. Tanner
Attorney, Agent, or Firm—Lewis B. Sternfels; A. W. Karambelas

[57] ABSTRACT

Cryogenic thermal switch (10) comprises base (30) which is clamped onto the flange of cold cylinder (24). Heat transfer ring (14) is positioned spaced between thermal clamp surfaces (36, 48) by means of support isolators (90,92,94). Springs (64) urge the clamp surfaces to clamp on ring (14) while metal tubes (70, 72, 74, 76) hold the clamp surfaces in a spaced position while at warm temperature. When the structure is cold, the metal tubes shrink and the springs (64) cause the surfaces to clamp on ring (14) for thermal conduction.

22 Claims, 2 Drawing Sheets

CRYOGENIC THERMAL SWITCH

BACKGROUND OF THE INVENTION

1. Field of the Invention

The cryogenic thermal switch automatically varies the heat transfer path between two separate temperature environments. It is particularly useful in automatically thermally connecting the cold stage of a cryogenic refrigerator to its heat load upon cold production by the refrigerator.

2. Description of Related Art

Large conventional refrigeration systems often have a plurality of compressors arranged in parallel together with a plurality of expansion valves arranged in parallel. Each expansion valve expands the fluid into an evaporator which is thermally associated with its load. Quite often a common high-pressure refrigerant line is employed from the output of the plural compressors, together with a common compressor suction line. Compressors can be added to or removed from the active refrigerant flow path, as required.

However, in cryogenic refrigerators the compressor is closely positioned and thermally coupled to the heat load because the refrigerant fluid remains in the gaseous state and is expanded in the cold cylinder of the refrigerator. It is thus much more difficult to provide parallel refrigerant sources to one or more thermal loads. There is no known prior art which satisfies the requirement for a self-contained thermal switch which can supply high contact forces for good thermal conduction while conducting, and low heat leak in the non-conducting state, and which is fully contained to retain all the dynamic reaction forces within the switch envelope.

SUMMARY OF THE INVENTION

In order to aid in the understanding of this invention, it can be stated in essentially summary form that it is directed to a thermal switch especially useful for automatically connecting a cryogenic refrigerator to its heat load when the refrigerator is operating by providing a pair of thermal conductive members which are urged in one direction with respect to each other by springs and in the opposite direction by differential expansion members so that changes in temperature of the differential expansion members cause clamping and unclamping of the thermal switch

BRIEF DESCRIPTION OF THE DRAWINGS

In the accompanying drawings

FIG. 3 is a further enlarged section through one of the thermal isolators shown in FIG. 2, with parts broken away.

DESCRIPTION OF THE PREFERRED EMBODIMENT

Thermal transfer situations sometimes require the opening and closing of a thermal pathway. This occurs when there are plural thermal driving sources in conjunction with one or more thermal loads. When a thermal source is operating, it is undesirable to lose the thermal capacity by leakage into non-operating thermal sources or non-operating thermal loads. More specifically, there are situations in which maintenance of refrigerator machinery is difficult or impossible and, in order to improve reliability of the system, redundant refrigerators are supplied. In order to prevent unnecessary heat gain into the operating refrigerator from the non-operating refrigerator, it is necessary to substantially open the thermal path from the non-operating refrigerator. At cryogenic temperatures, the conservation of refrigerator capacity by minimizing leakage is especially important.

Figure 1:
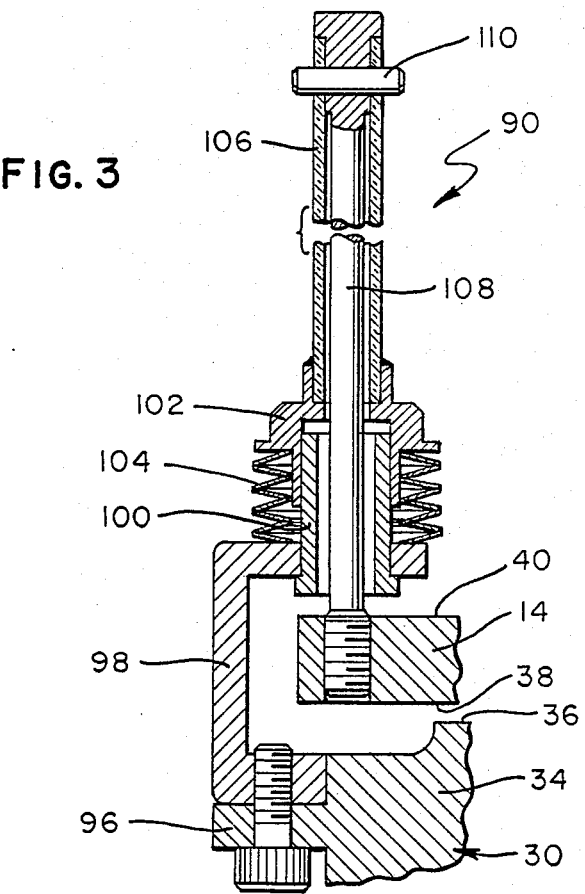
FIG. 1 is a plan view of two cryogenic thermal switches in accordance with this invention, connected so that two cryogenic refrigerators can selectively extract heat from a single cold load.

In those cases where it is difficult to reach the equipment for opening and closing the thermal pathway, for example, in relatively inaccessible applications, such as in remote earth locales or in space, it is desirable that the thermal switch automatically actuate as operating temperatures are achieved FIG. 1 shows two cryogenic thermal switches 10 and 12. The cryogenic switches respectively carry heat transfer members or rings 14 and 16. The heat transfer rings are thermally connected to load 18 by means of thermal conductors 20 and 22. In the preferred embodiment illustrated in FIG. 1, the thermal conductors are flexible so as to isolate refrigerator vibration from the load. A braided strap of copper wires is often used for that purpose. The load 18 may be any desired load, and quite often it is an electronic device where cryogenic temperatures reduce electronic noise For example, the load 18 may be an optical sensor device. Refrigeration is supplied by two refrigerators mechanically connected to the respective bottoms of the two cryogenic switches 10 and 12.

Figure 2:
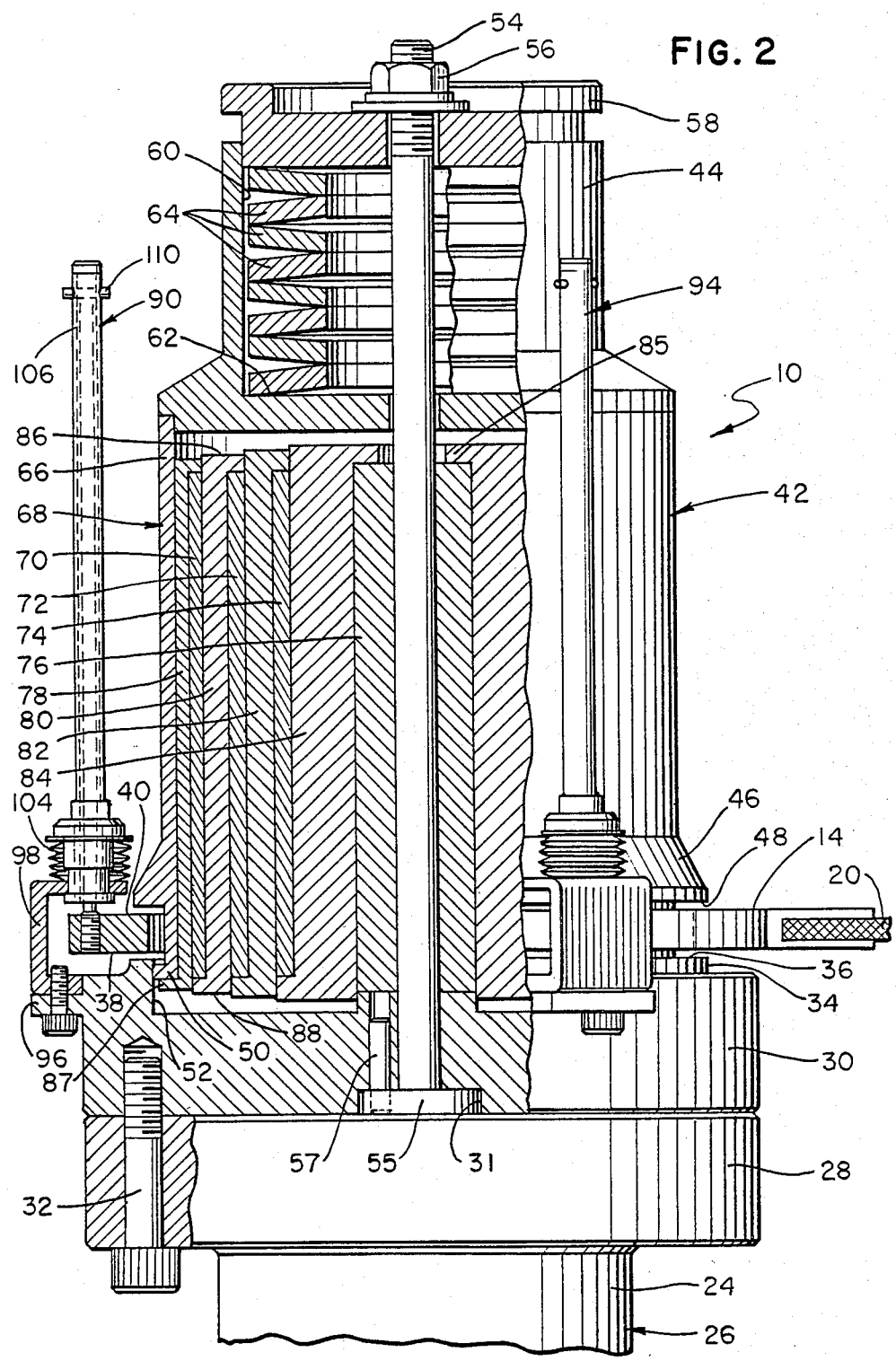
FIG. 2 is an enlarged vertical sectional view, taken generally along the line 2—2 of FIG. 1, showing one of the cryogenic thermal switches in detail, with parts broken away.

As illustrated in FIG. 2, the top end of a cold cylinder 24 of a refrigerator 26 is shown at the bottom of the figure with its flange 28 directly bolted to the bottom or base 30 of cryogenic switch 10 by bolts 32. The refrigerator for switch 12 is similarly secured to its bottom. When one of the refrigerators is not operating, its corresponding switch is open to prevent the heat load of the non-operating refrigerator from being a thermal load upon the operating refrigerator. Thus, when refrigerator 26 is operating, switch 10 must be closed and switch 12 should be open. When the refrigerator under switch 12 is operating, switch 12 must be closed and switch 10 should be open.

The switch 10 is shown in detail in FIGS. 2 and 3 and thus will be described in detail herebelow. It is understood that switch 12 is identical with switch 10. Referring to FIG. 2 and as stated above, base 30 of switch 10 is tightly secured to flange 28 such as by a plurality of machine screws, one of which is indicated at 32. The securement provides both support for the switch and a low resistance thermal path from flange 28 to base 30. Integrally formed with the upper part of base 30 is clamp boss 34 with its upwardly facing clamp surface 36. Heat transfer ring 14 is in the shape of an annular disc with an open center and is positioned over and spaced from the clamp surface 36. Ring 14 has lower and upper clamp surfaces 38 and 40.

Head 42 is in the form of a hollow sleeve 66 with a cover 44 thereon. Sleeve 66 has an outwardly extending flange 46 which has a downwardly facing clamp surface 48 thereon When head 42 moves down, heat transfer ring 14 is clamped between clamp boss 34 and flange 46 with the clamp surfaces in intimate engagement. The head 42 is controlled so that it clamps into contact with the clamp surfaces when heat transfer is desired and releases from contact with the clamp surfaces when it is not desired.

Below flange 46, head 42 has a skirt 50 which slides in recess 52 in the top of base 30 to guide the flange 46 into and out of clamping engagement. Tension bolt 54 has its head 55 secured in a recess 31 in the bottom of base 30. The head is pinned at 57 to base 30 to prevent the bolt from rotating. The top of the bolt carries nut 56 which engages cap 58. Cap 58 slides in spring pocket 60 in cover 44. Spring pocket 60 has a floor 62 on which is supported a plurality of spring washers 64. As is seen in FIG. 2, there are eight Belleville spring washers, which are serially positioned in opposition to each other to maximize stroke. As is seen in FIG. 2, cover 44 engages on the top of the outer tubular circular sleeve 66 which carries flange 46. Thus, cap 58 is rigid with respect to the base 30, with the spacing adjustment therebetween controlled by nut 56. The washers 64 thrust head 42 downwardly to urge the flange 46 towards clamp boss 34. When the switch 10 is cold, the springs tightly clamp the surfaces together to permit thermal conduction between base 30 and heat transfer ring 14.

When the base 30 is warm, clamp surfaces 36 and 48 are unclamped and separated by thermally responsive assembly 68. Assembly 68 comprises a sandwich construction comprising circular tubes 70, 72, 74 and 76 and hat-like cylinders 78, 80, 82 and 84. The tubes are made of a metal with a high coefficient of thermal expansion, such as of aluminum which the hat-like cylinders are formed of a material which has a low or negative thermal coefficient of expansion, e.g. Invar which has a substantially zero coefficient of thermal expansion. Cylinders 78, 80, 82 and 84 each have a right circular cylindrical body with an inwardly extending top flange and an outwardly extending bottom flange. For example, cylinder 80 has a top flange 86 which extends over the top of tube 72 and is in sliding engagement with the exterior of hat-like cylinder 82. Cylinder 82 also has a bottom flange 88 which extends under expansion tube 70 and is in sliding engagement with the interior surface of hat-like cylinder 78. The outer extending flange 87 of cylinder 78 is engaged under skirt 50 of sleeve 66 and the inner extending flange 85 of cylinder 84 is engaged over the top of expansion tube 76. The lower end of the expansion tube 76 engages the top of base 30. With this construction, when the cryogenic switch 10 warms, the expansion tubes 70, 72, 74 and 76 expand with the tube 76 to supply a downward force on base 30 and the cylinder 78 applies an upward force under the skirt 50. With the proper adjustment of nut 56, this expansion causes head 42 to rise and to unclamp the surfaces 36 and 48 from the surfaces 38 and 40 of ring 14 to the condition shown in FIG. 2.

When the clamped surfaces are released from heat transfer ring 14, it is important that the heat transfer ring be positioned out of contact with the clamp surfaces to eliminate mechanical contact and thus to eliminate thermal conduction by use of isolators or supports 90, 92 and 94. Supports 90, 92 and 94 are positioned around ring 14 and hold it spaced between and separated from the clamp surfaces 36 and 40 when the switch 10 is in the open, non-conductive position shown in FIG. 2. The three isolators 90, 92 and 94 are shown in FIG. 1, while only isolators 90 and 94 are shown in larger scale in FIG. 2 and isolator 90 solely is illustrated in cross-sectional detail in FIG. 3. Since the base 30 is warm when refrigerator 26 is not operating, ring 14 is cold by reason of the operation of the other refrigerator under companion switch 12. Because the supports are mounted on the then warm base 30, the supports function as thermal isolators.

As best shown in FIG. 3, an ear 96 extends outwardly from base 30 for the mounting of support 90. A bracket 98 is C-shaped and extends upwardly past ring 14 and then inwardly to carry the support above the outer portion of ring 14. A guide 100 is an upwardly extending circular tube which slidingly carries a cup 102. A series of Belleville spring washers 104 resiliently maintain the spacing of cup 102 above bracket 98. An isolator tube 106 of good compressive strength and low thermal conductivity, such as a fiber glass-loaded epoxy tube, couples cup 102 to a tension bar 108 which, in turn, is coupled to ring 14. Tension bar 108 is a solid metal bar of circular section, lies within isolator tube 106 and is spaced therefrom. It is also spaced from cup 102 and guide 100 so that there is no thermal conductivity directly therebetween. At the top, the tension bar and the isolator tube are secured together by means of a cross pin 110. At its lower end tension bar 108 carries threads and is screwed into a threaded hole adjacent the outer edge of heat transfer ring 14.

The length of the supports 90, 92 and 94 must be adjusted so that, when the switch is unclamped as shown in FIG. 2, the heat transfer ring 14 is substantially equally spaced between the clamp surfaces. This is accomplished in the warm position by adjusting the support lengths with the spring washers 104 unloaded. The spring washers 104 are of low force and only serve to position the heat transfer ring in this state. When the refrigerator 26 cools down, the tubes 70, 72, 74 and 76 shrink to permit the springs 64 to urge the clamp surfaces together. First, the flange 46 engages the top of ring 14 and urges it down towards boss 34 into clamping engagement therewith, and, in doing this, the isolators 90, 92 and 94 must move down. This is permitted by compression of the spring washers 104, which are pliant enough to permit this motion without over stressing the elements.

Springs 64 are compressed by the tightness of nut 56 to maintain firm contact between tubes 70–76 and hat-like cylinders 78–84 and to provide preloading of the structure. When this preloading is released by shrinkage of the aluminum expansion tubes, clamping quickly takes place and the entire spring force provided by the spring washers 64 is applied to the clamping surfaces to make good thermal contact.

In this way, a fully self-contained thermal switch is provided. The switch has high contact forces when closed to provide maximum thermal conductivity. It has low parasitic heat leak when the switch is open. Furthermore, it retains all of the dynamic reaction forces within the switch envelope. It is automatically closed when the refrigerator produces cold and is automatically opened when the refrigerator warms up.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:
1. A thermal system comprising:
first and second refrigerators;

first and second automatically operable thermal switches having thermal coupling means and respectively being thermally connected to said first and second refrigerators so that, when one of said refrigerators is operating, its respective thermal switch is closed and, when one of said refrigerators is not operating, its respective switch is open to inhibit thermal conductivity;

first and second heat transfer members respectively couplable to said first and second thermal switches by said thermal coupling means; and thermal connection means coupled to said first and second heat transfer members and to a thermal load so that, when one of said refrigerators is operating, heat from the load is transferred through said connection means and said heat transfer member of said thermal switch of said operating refrigerator to provide refrigeration for the load.

2. The system of claim 1 wherein said thermal coupling means includes a pair of first and second clamp surfaces respectively facing said heat transfer members, said pair of said first and second clamp surfaces being thermally connected to its corresponding refrigerator; and means for causing said pair of said clamp surfaces to clamp on said respective heat transfer members when said clamp surfaces are cold.

3. The system of claim 2 wherein each of said means for causing said clamp surfaces to clamp on said heat transfer member comprises a spring for urging the clamping, and further including a thermally responsive member which skrinks upon reduction in temperature to permit said spring to clamp said clamp surfaces on said heat transfer member.

4. A thermal system comprising:
first and second refrigerators;
first and second automatically operable thermal switches respectively thermally connected to said first and second refrigerators and including a pair of first and second clamp surfaces thermally connected to respective ones of said refrigerators, said refrigerators being so interconnected that, when one of said refrigerators is operating, its respective thermal switch is closed and, when the other of said refrigerators is not operating, its respective switch is open to inhibit thermal conductivity;

a first heat transfer member forming a part of said first thermal switch and a second heat transfer member forming a part of said second thermal switch, said pair of said first and second clamp surfaces facing said respective heat transfer members;

means for causing said pair of said clamp surfaces to clamp on said respective heat transfer members when said clamp surfaces are cold;

thermal connection means connectable to said first and second heat transfer members and to a thermal load so that, when one of said refrigerators is operating, heat from the load is transferred through said connection means and said heat transfer member of said thermal switch of said operating refrigerator to provide refrigeration for the load; and thermal isolator means connected to said heat transfer member and one of said clamp surface to enable said heat transfer member to be position away from said clamp surfaces when said clamp surfaces are warm.

5. The system of claim 4 wherein said clamp surfaces are annular and said transfer member is a ring positioned between said clamp surfaces.

6. A thermal switch comprising:
a base thermally connectable to a source of refrigeration;
first and second clamp surfaces facing each other and thermally connected to said base;
a heat transfer member positioned between said clamp surfaces and adapted to be connected to a thermal load;
means for clamping said clamp surfaces against said heat transfer member when thermal connection between said base and said heat transfer member is desired; and
means for positioning said heat transfer member between said clamp surfaces and out of contact with said surfaces when minimum thermal conductivity between said base and said heat transfer member is desired.

7. A thermal switch comprising:
a base thermally connectable to a source of refrigeration;
first and second clamp surfaces facing each other and thermally connected to said base;
a heat transfer member positioned between said clamp surfaces and connected to a thermal load; and
means for clamping said clamp surfaces against said heat transfer member for thermally connecting said base and said heat transfer member together.

8. The thermal switch of claim 6 wherein one of said clamp surfaces is on said base and the other of said clamp surfaces is on a flange movably mounted with respect to said base.

9. The thermal switch of claim 8 wherein said movable flange is mounted upon a head, a spring engaging against said head and said base to urge said head in the direction to close said heat transfer surfaces towards each other, and a temperature responsive member between said base and said head to maintain said clamp surfaces separated from said heat transfer member until said temperature responsive member is cooled to a predetermined temperature.

10. The thermal switch of claim 9 wherein said temperature responsive member is a metal which changes dimension upon changes in temperature.

11. The thermal switch of claim 9 wherein said temperature responsive member is a metal having a positive thermal coefficient of expansion.

12. The thermal switch of claim 11 wherein said metal temperature responsive member is between said head and said base and in compression due to the force of said spring when said surfaces are separated from said heat transfer member.

13. The thermal switch of claim 12 wherein said metal temperature responsive member is formed into a plurality of concentric tubes and there is a plurality of tension members, each tube of said plurality of concentric tubes being connected to an adjacent tension member, said tension members having a substantially zero coefficient of thermal expansion.

14. The thermal switch of claim 13 further including:
means coupled to said base and said heat transfer member for positioning said heat transfer member between said clamp surfaces and out of contact with said surfaces when minimum thermal conductivity between said base and said heat transfer member is desired.

15. The thermal switch of claim 14 wherein said means for positioning is a resiliently mounted thermal isolator.

16. A thermal system comprising:
a base mounted on a refrigerator and including a clamp surface;
a head movably mounted with respect to said base, said head having a clamp surface thereon facing said clamp surface on said base;
a spring engaged between said head and said base for biasing said clamp surfaces towards each other;
a heat transfer member positioned between said clamp surfaces for enabling said spring to clamp said surfaces against said heat transfer member and to provide thermal conductivity between said base and said heat transfer member; and
a temperature responsive member positioned between said base and said head and acting against the bias of said spring for maintaining said clamp surfaces away from said heat transfer member when the temperature of said temperature responsive member is above a predetermined value.

17. The thermal switch of claim 16 wherein said clamp surface on said base is circular and said head is circular with a circular flange thereon carrying said clamp surface on said head and said heat transfer member is an annular ring positioned between said clamp surfaces.

18. The thermal switch of claim 17 wherein said temperature responsive member is a metal having a positive thermal coefficient of expansion.

19. The thermal switch of claim 18 wherein said temperature responsive member comprises a plurality of concentric metal tubes, said plurality of tubes being connected together by means of hat-like cylinders having a substantially zero coefficient of thermal expansion.

20. The thermal switch of claim 19 wherein said spring comprises a compression spring within said head, and said tubes and said hat-like cylinders form a sandwich construction contained within said head.

21. The thermal switch of claim 20 further including a thermal isolator and positioner interconnected between said base and said heat transfer member for spacing said heat transfer member from both of said clamp surfaces when said clamp surfaces are not clamped against said heat transfer member.

22. A thermal switch comprising:
a base mounted on a refrigerator, and a clamp surface on said base;
a head movably mounted with respect to said base, said head having a clamp surface thereon facing said clamp surface on said base;
a spring engaged between said head and said base to urge said clamp surfaces towards each other;
a heat transfer member positioned between said clamp surfaces so that said spring can clamp said surfaces against said heat transfer member to provide thermal conductivity between said base and said heat transfer member;
a temperature responsive member positioned between said base and said head for maintaining said clamp surfaces away from said heat transfer member when the temperature of said temperature responsive member is above a predetermined value; and
a thermal isolator and positioner interconnected between said base and said heat transfer member for spacing said heat transfer member form both of said clamp surfaces when said clamp surfaces are not clamped against said heat transfer member.

* * * * *